United States Patent Office 2,994,233
Patented Aug. 1, 1961

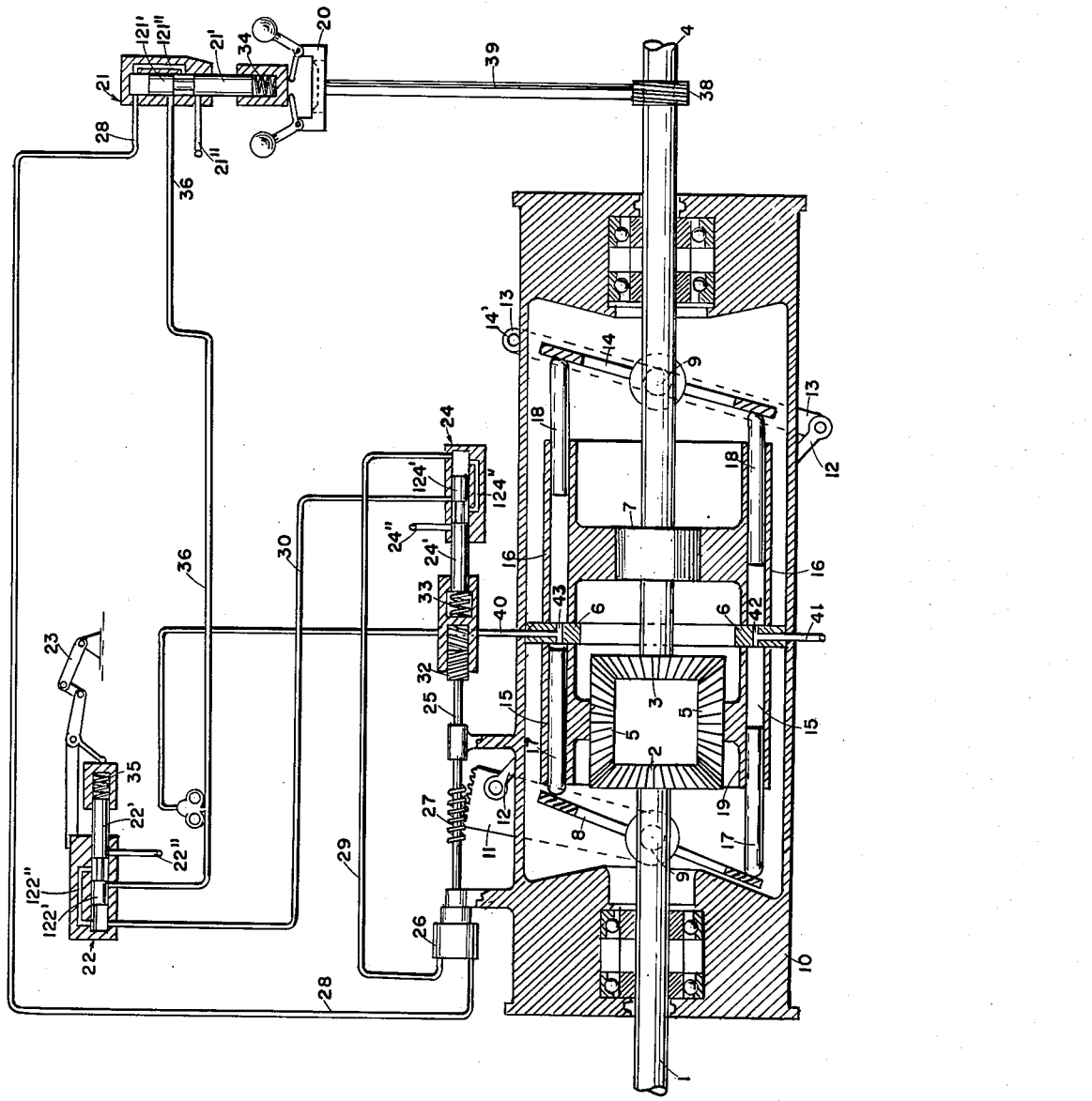

2,994,233
STEPLESS TORQUE CONVERTER
Conrad Gerard, Frankfurt-am-Main-Bonames, Germany
Filed Apr. 28, 1958, Ser. No. 731,366
Claims priority, application Germany Apr. 29, 1957
7 Claims. (Cl. 74—687)

This invention relates to stepless torque converters for automotive vehicles and the like.

Generally, in such systems, the desired transmission ratio is attained by means of hydraulic and mechanical control elements by which an input shaft is coupled with a variable speed ratio to an output shaft.

The object of this invention is to provide an improved hydraulic torque-converting system adapted to vary the speed ratio between two shafts in a stepless way, having simple and dependable means for effecting a required transition from one torque ratio to another in response to different load and/or input conditions.

A feature of the present invention resides in the provision of a hydraulic impeller and a hydraulic follower or motor whose speed ratio may be varied with the aid of suitable control means, such as two swash plates, operatively coupled with a differential governor responsive to the speed of a driven shaft and, advantageously, also to the position of an input element (e.g. an accelerator pedal) controlling the speed of an engine which is coupled to a drive shaft.

The connection between the drive shaft and the driven shafts is preferably effected by means of a differential gear the rotatable housing of which, carrying the usual planet gear, is rigid with or part of the housing of the hydraulic impeller.

Another feature of the invention is the provision of a differential control system consisting essentially of a throttle-controlled regulating valve, a centrifugally controlled regulating valve and a reaction-controlled regulating valve, the three valves co-acting to establish a transmission ratio appropriate to the momentary input and load conditions.

The above and other features will become more fully apparent from the accompanying drawing the sole FIGURE of which represents, somewhat diagrammatically, an axial section of a stepless torque converter embodying the invention.

As shown in the drawing, the torque converter comprises an input shaft 1 which may be driven by a conventional gasoline engine (not shown) and is connected with an input sun wheel 2 of a conventional mechanical differential gear, an output sun wheel 3 being connected to an output shaft 4. Two planet wheels 5 are loosely mounted on the opposite interior walls of an annular differential cage 19. The exterior walls of cage 19 form a pump housing 15 for a plurality of cyclically arranged pistons 17 (only two shown) rotating with the entire differential cage around the axis of shafts 1, 4; these pistons bear upon an annular swash plate 8. The input torque applied to the differential gear starts the hydraulic swash-plate pump 15, 17 working to drive hydraulic fluid through a valve plate 6 into a hydraulic swash-plate motor which consists, similarly to the pump, of a motor housing 16 and of a plurality of pistons 18 (only two shown) bearing upon an annular swash plate 14. The motor in housing 16 is rotatably mounted on output shaft 4, by way of a conventional overrunning clutch 7, for unidirectional entrainment of the latter in the sense of rotation of shaft 1.

Valve plate 6 is attached to the stationary external housing 10 of the converter so that it fits between the rotating pump and motor housings 15 and 16. The valve plate has two arcuate channels 42, 43 each registering with the piston cylinders of housings 15 and 17 over an arc close to 180°. The top channel 43 opens into a hydraulic discharge conduit 40, leading in turn to a conduit 36, while the bottom channel 42 is connected via an intake tube 41 to a hydraulic-fluid reservoir (not shown).

The input swash plate 8 is pivotable around the axis of a shaft 9 guided through external housing 10. The setting angle of swash plate 8 is adjusted by a toothed segment 11 which is also connected by a linkage 12 to a lever 13 adapted to swing the output swash plate 14 about its pivot 14' in a sense reciprocal to that of swash plate 8. The relative pitch of these swash plates determines the rate and the direction of the flow of hydraulic fluid between pumps 15, 17 and 16, 18.

Toothed segment 11, controlling the relative angular positions of the two swash plates, is actuated by a worm gear 27 whose shaft 25 is driven by a hydraulic motor 26. The latter communicates with two hydraulic conduits 28, 29 which are connected to two of the three regulating valves 21, 22 and 24 of the system, namely the centrifugal valve 21 and the reaction valve 24. When hydraulic fluid flows in through conduit 28 and out through conduit 29, motor 26 will move segment 11 away or to the right; when the flow passes from conduit 29 through motor 26 to conduit 28, segment 11 will move inward or to the left. The reduction or the increase in the setting angles of swash plates 8, 14 depends consequently on the direction of flow of the fluid through motor 26.

The centrifugal regulating valve 21 is controlled by output shaft 4 via a conventional centrifugal governor 20 whose shaft 39 is driven by a worm wheel (not shown) meshing with a worm 38 on shaft 4. The valve 21 comprises a piston 21' with piston head 121', two ports respectively connected to hydraulic conduits 28 and 36, a third port connected to a discharge tube 21" leading to the aforementioned fluid reservoir, a bypass channel 121", and a restoring spring 34 bearing upon piston 21'.

The reaction valve 24 is operatively connected to the shaft 25, via a screw box 32 which, while being held against rotation by means not shown, matingly receives a threaded extremity of shaft 25 and also contains a restoring spring 33 inserted so as to bear upon the valve piston 24'. Valve 24 has two ports located on opposite sides of its piston head 124', respectively connected to hydraulic conduits 29 and 30, and a third port connected to a discharge tube 24" communicating with the common fluid reservoir, and a bypass channel 124".

The third regulating valve 22, termed a throttle valve, has a piston 22' operatively connected with a conventional accelerator pedal 23 controlling the fuel supply of the motor driving the input shaft 1. Valve 22 comprises, on opposite sides of piston head 122', two ports respectively connected to hydraulic conduits 30 and 36, a third port connected to a discharge tube 22" also leading to the common reservoir, a bypass channel 122", and a restoring spring 35 inserted between gas pedal 23 and valve piston 22'.

The valves 21, 22 and 24 are all of similar construction. In the normal position of each valve its piston cuts off the reservoir connection (e.g. at 21") and interconnects via its bypass (e.g. 121") the conduits (28, 29, 30, 36) terminating at its other two ports. In a transient position which can be brought about by the pressure of fluid against the force of its restoring spring, only the port located forwardly of the piston head is open so that the fluid entering through it may continue to push the piston back into an off-normal position in which the associated conduit (e.g. 28) can communicate, again through the bypass channel, with the reservoir connection. When the fluid pressure upon the piston head is reduced, the piston returns through the illustrated transient position to normal.

The operation of this system is as follows:

It will be assumed that shaft 1 is rotating at a speed controlled by the position of accelerator pedal 23, that the piston heads 121′, 122′, 124′ of valves 21, 22, 24 are all in their normal (forward) position to establish communication between conduits 28 and 36, 30 and 36, 29 and 30, respectively, and that otherwise the parts are in their position illustrated in the drawing, with both swash plates 8 and 14 inclined relatively to the axes of shafts 1 and 4. With output shaft 4 connected to a variable load, such as the wheels of a vehicle encountering a variety of driving conditions, the optimum speed ratio between shafts 1 and 4 will likewise be subject to change.

So long as the pitch of swash plates 8 and 14 is appropriate to the load, substantially all of the hydraulic fluid delivered by the pistons 17 of pump 15 across upper valve channel 43 will be absorbed by the motor 16 while a like quantity of fluid will be returned by the motor pistons 18 to the pump 15 through the lower channel 42. With no excess fluid delivered to conduit 40, the motor 16 will have a velocity $v_{16}$ related to the velocity of $v_{15}$ of pump 15 by the formula $v_{16}=kv_{15}$ wherein $k$ is a coefficient determined by the setting angles of the two swash plates. Because of the action of differential gear 2, 3, 5, the speed $v_1$ of input shaft 1 is related to the speed $v_4$ of output shaft 4 by the formula $v_1+v_4=2v_{15}$. Since, furthermore, $v_4$ may be either equal to or greater than $v_{16}$, owing to the unidirectional free-wheeling action of overrunning clutch 7, the relationship between $v_1$ and $v_4$ may be expressed by formula $v_4 \geqq kv_1/(2-k)$. This relationship can also be expressed as $R=k/(2-k)$ where R is the speed ratio $v_4:v_1$. It follows that, for finite values of R, the coefficient $k$ must have a value greater than zero but less than 2.

With no fluid reaching the line 36 through conduit 40, the hydraulic motor 26 is not actuated and the position of the swash-plate-controlling sector 11 remains unchanged. From time to time, however, the motor driving the shaft 1 will deliver insufficient power to the system to maintain the existing speed ratio R with the given value of $k$; this may be due either to a voluntary slowdown, with the driver releasing the gas pedal 23 to reduce speed, or to a forced deceleration due to terrain conditions such as uphill drive, in which case the operator will step on the pedal 23 in an effort to maintain speed. In either case, fluid will enter the conduit 40 and will branch out in line 36 to flow via valve 21 and line 28 to the lower input of hydraulic motor 26 and via valve 22, line 30, valve 24 and line 29 to the upper input thereof. Since the two pressures are equal, motor 26 will not turn.

The pressure of the excess fluid from pump 15 acts also upon the piston heads 121′, 122′, 124′ of the three regulating valves. With sector 11 and screw box 33 near the right-hand limit of their range of displacement, as shown, spring 33 resists strongly any leftward thrust of piston 24′ so that the presence of valve 24 may be disregarded at this point. As the pressure in conduit system 28, 29, 30, 36 builds up, either the centrifugal valve 21, controlled by the speed of output shaft 4, or the throttle valve 22, controlled by the gas pedal 23, will yield first. If the slowdown has been voluntary, the pressure of spring 35 upon piston 22′ will be less than that of spring 34 upon piston 21′; thus, piston 22′ will be repressed beyond its illustrated transient position into a position in which its reservoir connection 22″ is unblocked while conduit 36 is obstructed by its head 122′, a closed circuit being thus established for fluid passing from the reservoir through tube 41, pump 15, conduit 40, right-hand branch of conduit 36, valve 21, conduit 28, hydraulic motor 26, conduit 29, valve 24, conduit 30, valve 22 back to the reservoir. Hydraulic motor 26 now turns in such sense as to displace the sector 11 (and, incidentally, the screw box 33) further to the right, thereby increasing the values of both $k$ and R. As a result of this increase in transmission ratio, output shaft 4 may continue to tur nat virtually undiminished speed even though, as a consequence of the raising of gas pedal 23, the input shaft 1 rotates at a considerably slower rate. When the new equilibrium has been established, the passage of fluid through conduit 40 ceases and the motor 26 stops. If, on the other hand, the pedal 23 is depressed to a greater or less extent while the speed of output shaft 4 declines, the fluid pressure in conduit 28 will force back the piston 21′ of valve 21 so that excess fluid may return through outlet 21″ to the reservoir, conduit 36 being at the same time cut off by piston head 121′. Under these conditions the hydraulic motor 26 is energized to rotate in the opposite sense and moves segment 11 as well as screw box 33 to the left, thereby reducing the values of $k$ and R and enabling accelerated roation of shaft 1 to cope with the increased load.

With the system so far described, there would be a tendency for the fluid delivered by pump 15 to continue traversing the hydraulic motor 26 (via lines 30, 29, 28) in such direction as to increase the setting angle of swash plate 8 when the output shaft 4 is at standstill, with the result that swash plate 8 would assume a nearly vertical position in which the delivery of fluid through conduit 40 would be greatly reduced. This would make fast starting difficult, owing to the limited fluid pressure available to restore the swash plates to a position nearer to that shown in the drawing. In order to avoid this difficulty, reaction valve 24 is so adjusted as to take over the function of throttle valve 22 at low speeds, thereby providing at its outlet 24″ a path for the return of fluid to the reservoir by way of conduit 36, valve 21, conduit 28, motor 26 and conduit 29. This reverses the leftward displacement of sector 11 and limits the setting angle of swash plate 8 to substantially less than 90°.

It will thus be seen that the system of the invention operates by differential action as between a first regulating valve 21 and a second regulating valve 22 and, in a supplemental manner, by a differential action as between the second regulating valve 22 and a third regulating valve 24. Each of these valves responds to fluid pressure with a variable degree of sensitivity; the sensitivity of the first two valves varies with the speed of an output shaft and with the speed of an input shaft, respectively, while that of the third valve is adjusted to vary with the transmission ratio of a hydraulic pump and motor unit 15, 16 whose overflow produces the aforesaid fluid pressure. The principles of the invention herein disclosed may, of course, be embodied in systems other than the one specifically described and illustrated without departing from the spirit and scope of the appended claims.

What is claimed is:

1. In a hydraulic transmission system, in combination, a torque-conversion unit comprising a hydraulic impeller and a hydraulic follower, an input shaft operatively coupled with said impeller, an output shaft, coupling means operatively connecting said output shaft with said follower, a source of hydraulic fluid for said unit, a first regulating valve, a second regulating valve, a third regulating valve, conduit means establishing a closed path with two branches for the return of excess fluid from said unit to said source by way of said regulating valves, said valves being differentially responsive to pressure of said fluid for routing its flow through either of said branches, fluid-responsive adjusting means in said path operatively linked with said unit for varying its transmission ratio in one sense or the other in response to passage of fluid through one of said branches or the other, first control means for varying the pressure sensitivity of said first valve with changes in speed of said output shaft, second control means for varying the pressure sensitivity of said second valve with changes in the speed of said input shaft, and third control means for varying the pressure sensitivity of said third valve with changes in the transmission ratio of said unit, each of said valves comprising a piston, a restoring spring bearing upon said piston, and an adjustable support for said spring coupled with the respective control means.

2. A system according to claim 1 wherein said first control means comprises a centrifugal governor coupled with said output shaft, said governor having arms bearing on the adjustable spring support of said first valve.

3. A system according to claim 1 wherein said second control means comprises throttle means for varying the speed of said input shaft, said throttle means having an arm bearing on the adjustable spring support of said second valve.

4. A system according to claim 1 wherein said adjusting means comprises a hydraulic motor having a shaft, said third control means comprising screw threads on said shaft threadedly engaging the adjustable spring support of said third valve.

5. A system according to claim 4 wherein said impeller is a piston pump and said follower is a piston motor, said unit further comprising a first swash plate controlling the piston stroke of said pump and a second swash plate controlling the piston stroke of said motor.

6. A system according to claim 5 wherein said third control means further comprises a sector gear meshing with part of said screw threads, said sector gear being coupled with at least one of said swash plates.

7. A system according to claim 6 wherein said pump and said motor have a common axis, said swash plates being pivotally mounted at inclinations relative to said axis and being provided with link means interconnecting said swash plates for varying the inclinations reciprocally to each other.

References Cited in the file of this patent

UNITED STATES PATENTS

| | | |
|---|---|---|
| 2,383,981 | Lysholm | Sept. 4, 1945 |
| 2,583,656 | Lay | Jan. 29, 1952 |
| 2,599,814 | Cull | June 10, 1952 |
| 2,869,397 | Weaving et al. | Jan. 20, 1959 |
| 2,931,250 | Ebert | Apr. 5, 1960 |